Patented Jan. 22, 1935

1,988,599

UNITED STATES PATENT OFFICE 1,988,599

DOG CATCHER

George E. Lowe, Indianapolis, Ind.

Application August 5, 1933, Serial No. 683,777

3 Claims. (Cl. 119—153)

The object of this invention is to provide an instrument with which animals, and particularly stray dogs, including those suffering from rabies, may be safely caught and securely held, by policemen and others, and handled for loading into conveyances or placing in confinement.

I accomplish the above, and other objects which will hereinafter appear, by the means illustrated in the accompanying drawing, in which—

Fig. 1 is a view in side elevation of the instrument in position for catching an animal;

Fig. 2 is a fragment on an enlarged scale of the end to which the cord is fastened;

Fig. 3 is a fragment of the same end as in Fig. 2, but showing the instrument turned quarterway around to show the side of the handle along which the cord is extended;

Fig. 4 is a cross section on the line 4—4 of Fig. 2, and

Fig. 5 is an elevation looking at the end to which the cord is attached and showing the cord in cross section.

Like characters of reference indicate like parts in the several views of the drawing.

A handle 6 is generally of stout wood of about a yard in length across the slightly larger end of which a metal plate 7 is fastened, here shown as by a screw 8 passing through the plate and seated in the end of the handle, and also by a hollow metal extension 9, which forms a socket that receives the end of the handle with a close fit. A screw or rivet 10 is preferably passed through the wall of the socket into the handle to additionally retain the extension 9 and plate 7 on the handle.

Here shown as at diametrically opposite sides of the plate are rounded extensions 11 and 12, each of which is pierced by an eye 13, 13, and in approximate alignment with the eye in extension 12 are a series of screw eyes 14, here shown as two in number but obviously a greater or less number may be used. These screw eyes are securely seated in the handle.

A stout stiff cord 15 is threaded through the eye in extension 11 and is bent in a loop and fastened to itself, as shown, so as to permanently secure one end of the cord to the plate. The other end of the cord is threaded through the eye in the extension 12 and through the screw eyes 14 of the handle, and is long enough to extend beyond the last loop to be grasped between the hand and handle as shown in Fig. 1.

Attention is called to the formation of the eyes 13 wherein their walls taper toward the middle of the eye to form a sharp annular ridge or rib, as best shown in the sectioned part of extension 12 of Fig. 2. This reduces the slippage of the cord in the eye and helps to hold a tight noose around a dog's neck.

The operation of my invention is as follows:

With the cord attached to the handle and threaded through the eye in extension 12 and at least through the next eye 14, the handle is grasped in one hand and the cord in the other hand. The cord which is preferably a stiff one to hold its shape is slipped forward through the eyes until it forms a large loop or noose at the outer end of the handle. This noose is then easily slipped over the head of a dog to be caught and is immediately drawn tight by pulling on the cord still held in one hand of the operator. Up to this stage the cord may not be passed through the inner screw eyes on the handle, but as soon as the noose is tight enough around the neck of the animal to subdue him by choking, the cord is threaded through the remaining eye or eyes and is then grasped between the handle and the fingers of the hand holding the handle, where it will be securely held, leaving the other hand free to use a gun when the animal is to be immediately killed, or for loading it into a conveyance for transportation to a pound. The rib in the eye of extension 12 aids in holding the cord from slipping to enlarge the noose.

Having thus fully described my invention and the manner of its use, what I claim as new and wish to secure by Letters Patent of the United States, is—

1. A device for the purposes specified comprising a cord, a handle having an eye at its outer end to which one end of the cord is fastened, said handle also having a second eye at its outer end with a tapering bore forming a sharp inside rib and said handle having one or more additional eyes on the outer side of the handle in alignment with the last eye, said cord being entirely outside of the handle at all of its length and formed into a noose between the first and second eyes and its free end threaded through the remaining eyes, and said cord being held from slipping by grasping it between the operator's hand holding the device, and the device handle.

2. A device for the purposes specified comprising a cord, a handle, a plate having a socket receiving and secured to an end of the handle, said plate having a pair of diametrically opposite extensions with an eye in each extension to one of which extensions an end of the cord is fastened and through the eye in the other extension the cord is threaded, the last eye being circular and Jan. 22, 1935.  A. D. MACLACHLAN  1,988,600
SAFETY DEVICE FOR OIL AND FUEL PIPES
Filed Sept. 20, 1930
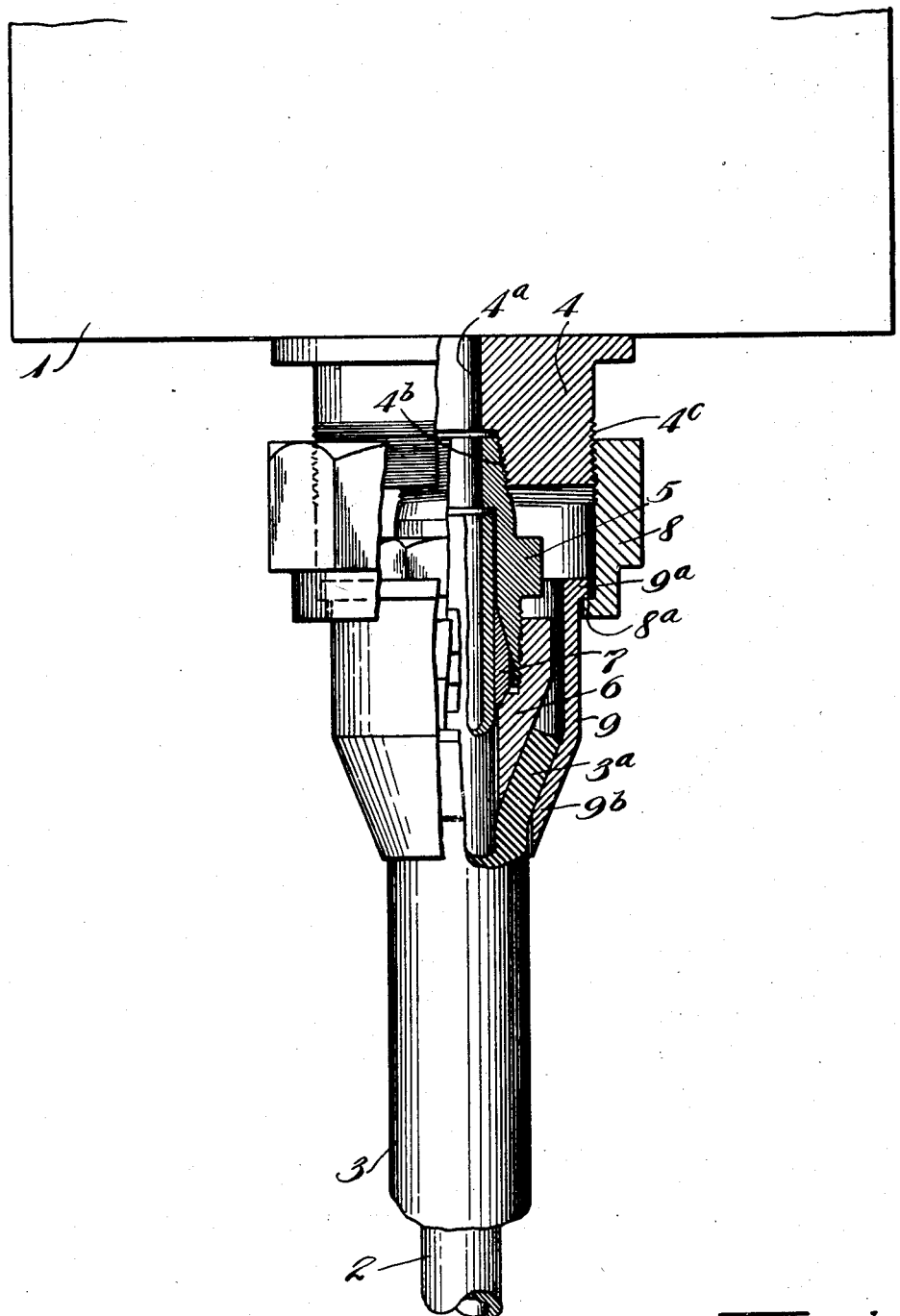
Inventor
Andrew D. MacLachlan
By Eakin & Avery
Attys.